FUNCTION GENERATOR USING TELEVISION-TYPE SCANNING
Filed Aug. 4, 1958
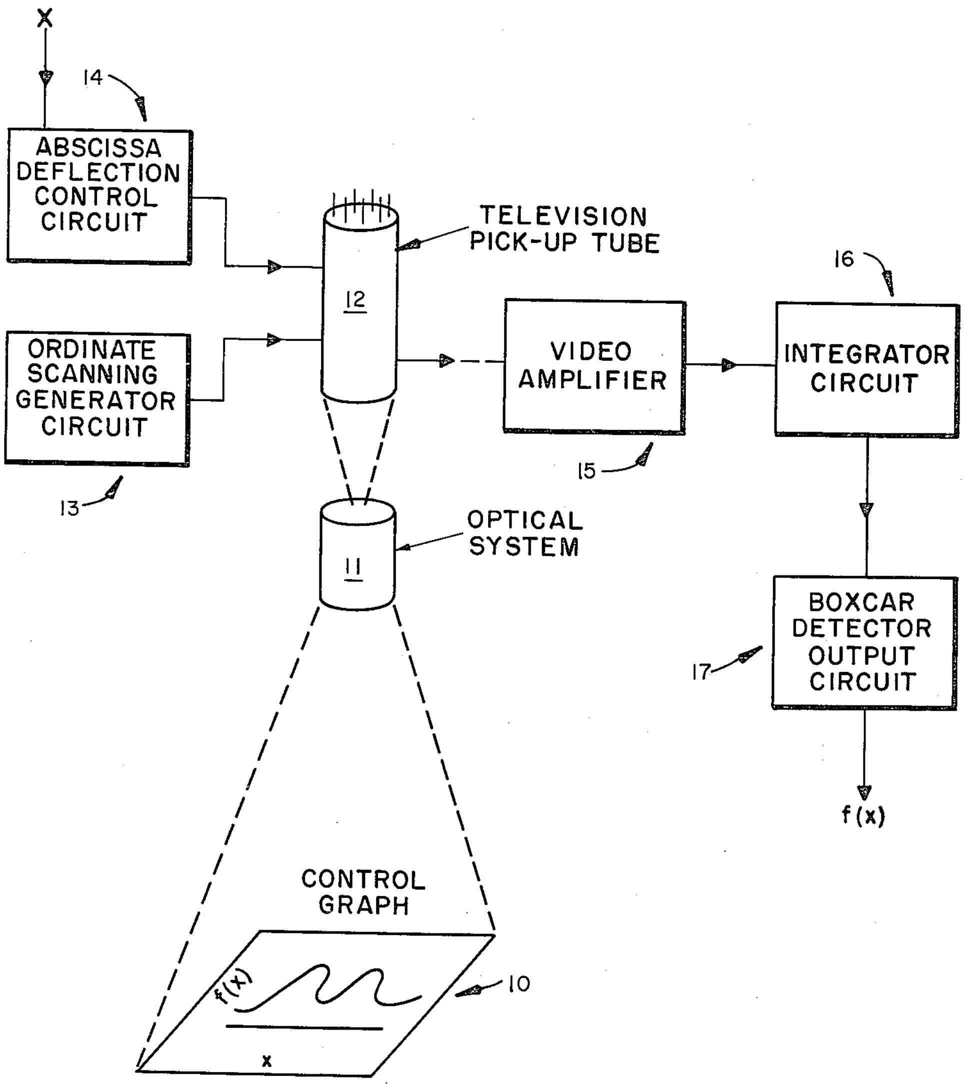
INVENTOR.
F.C. ALPERS
BY
V.C. Muller
ATTORNEYS United States Patent Office 3,018,053
Patented Jan. 23, 1962

3,018,053
FUNCTION GENERATOR USING TELEVISION-TYPE SCANNING

Frederick C. Alpers, Riverside, Calif., assignor to the United States of America as represented by the Secretary of the Navy Filed Aug. 4, 1958, Ser. No. 753,165
2 Claims. (Cl. 235—198)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in function generators and it has particular relation to a function generator wherein a television pick-up tube and television type scanning are used to read a function off of graph paper and processing a video signal thus obtained to derive a voltage proportional to the function.

It has been conventional, heretofore, to use a servo controlled to follow an input $x$ to drive any one of a plurality of function generator devices such as cams cut according to the desired function $f(x)$, a cylindrical drum having wires formed thereon according to the function and driving a potentiometer as the drum is rotated, specially tapered potentiometers or tapped potentiometers with the taps loaded externally to conform with the desired function. Other methods of present function generators include the use of a number of diodes which come into conduction successively and which by suitable loading effects on an input $x$ transform it to a desired function $f(x)$ and use of a cathode ray tube beam which is made through a photocell feedback arrangement to follow the contour of a mask placed against the face of the tube. The latter method, known as the "photoformer" utilizes a cathode ray receiving tube whereas the present invention operates differently and uses a television pick-up tube such as an image orthicon or vidicon.

The prior function generators described above had many disadvantages because they were either very complex, too slow in response, difficult to set up, capable of generating only limited functions or they would give only an approximation of the desired functions such as approximating a curve by a plurality of straight line segments.

In accordance with the present invention a desired function plotted on a piece of graph paper is focussed as an image on the face of a television pick-up tube. The beam of the pick-up tube, under the constant control of scanning and deflection circuits, rapidly scans the image of the graph in the ordinate direction in a periodic fashion, and on a slower time scale moves parallel to the abscissa in accordance with variations on an input, independent variable X, whereby each time the beam crosses a line in the image a signal is generated in the signal plate of the pick-up tube. As the distance from the abscissa axis to the graph curve varies so will the time vary between the signal generated at the crossing of the abscissa and the signal generated at the crossing of the graph. The signals are fed through a video amplifier to a switched integration circuit then to an output circuit. The integrator, starting from zero voltage, begins a constant increase of voltage at the time of the first signal and discontinues the increase in voltage at the time of the second signal, whereby the voltage at the time of the second signal is directly proportional to the desired function $f(x)$ and the output circuit continuously gives this voltage as a desired output of the function generator, as the input $x$ varies independentlly.

One of the objects of the present invention, therefore, is to provide an improved method for function generation and means for determining the instantaneous values of a function through the television type scanning of a graph.

A further object of the invention is to provide an improved function generator utilizing a television type scanning system to produce a voltage output which varies as a desired mathematical function of a freely variable input signal.

A further object of the invention is to provide a video scanning circuit as a function generator in which the voltage output of the circuit, is directly proportional to the function viewed.

A still further object of the invention is to utilize a television type scanning system to scan a function plotted on a graph and feed the video signal of the scanning system to a switch integrator circuit whereby the voltage output is directly proportional to the plotted function of an independent input variable.

Other objects and many of the attendant advantages of this invention will be readily appreciated as the same becomes better understood by reference to the following detailed description when considered in connection with the accompanying drawings wherein:

The single FIGURE of the drawing is a block diagram of one of the preferred embodiments of the invention.

Referring to the single figure of the drawing the desired function $f(x)$ to be generated is plotted as the ordinate on a conventional piece of graph paper 10 on which the independent variable is taken as the abscissa. The function $f(x)$ and a reference line, usually the abscissa axis, are made distinct from the background by the use of black lines on white paper or other suitable means. The graph 10 is a controlling element and a suitable optical system 11 focusses an image of the graph 10 on the face of a television pick-up tube 12. Beam deflection on one axis of the pick-up tube is accomplished by a scanning generator circuit 13 which operates the same as the horizontal sweep on a conventional television set, giving rapid repetitive scan of the pick-up tube along an axis parallel to the ordinate axis of the graph 10 while beam deflection along the orthogonal axis is controlled by another slower acting conventional deflection control circuit 14 in direct proportion to the amplitude of an input signal $x$. The axes of beam deflections are oriented so as to correspond with the orientation of the graph 10 whereby the beam of the pick-up tube 12 under control of the constant scanning circuit 13 scans the image of the graph 10 in the ordinate direction and the deflection control circuit under the influence of the input signal $x$ moves the beam parallel to the abscissa of the graph 10 so as to scan only that point of the graph 10 which represents the then existent value of the variable.

As the beam scans rapidly under control of the scanning generator circuit 13 it crosses the abscissa axis at the coordinate and then later crosses function curve $f(x)$ along the same coordinate. Each time the beam crosses a line in the image in this manner a signal is generated in the signal plate of the pick-up tube 12 whereby as the distance from the abscissa axis to the graph curve varies so will the time vary between the first signal generated at the beam crossing of the abscissa and the second signal generated at the beam crossing of the graph curve $f(x)$. Since this sweep is normally very linear, this time will be directly proportional to the value of the function $f(x)$ at the coordinate along the abscissa axis.

The signals generated from the signal plate of the pick-up tube 12 are fed through a video amplifier 15 to a switched integration circuit 16 and then to an output circuit 17. The amplifier 15 raises the signals from the pick-up tube to a useable voltage level.

The switched integrator 16, starting from zero voltage, begins a constant increase of voltage at the time the first signal arrives and discontinues the increase in voltage at the time the second signal arrives. Thus the voltage in the integrator circuit at the time of the second signal is directly proportional to the time between the first and second signals and in turn the voltage is proportional to the desired function $f(x)$. Between scans the switched integrator circuit is returned to zero voltage output so as to be ready for the next scan; however, the boxcar detector output circuit retains the peak voltage achieved by the integrator circuit 16 and gives this peak voltage proportional to $f(x)$ as the desired output of the function generator.

In operation of the invention the scanning action is applied to different parts of the graph as $x$ varies, so that for each new value of $x$ the appropriate coordinate on the graph 10 is the only one followed and fairly rapid fluctuations in $x$ can be accommodated since each scan of the circuit 13 need only involve 100 microseconds or less of time.

For functions $f(x)$ which go to zero or pass through zero at certain points the line along the abscissa axis is replaced by another reference line (not shown) which is not crossed by the function graph line $f(x)$ in the region of $x$ values which are of interest. This has the effect of making the output voltage from the circuit 17 equal to $[f(x) \pm k]$ where $k$ is a known constant which can readily be subtracted to give $f(x)$ in pure form.

The function generator can be calibrated by placing additional marks on the control graph 10 at desired points and adjusting the circuitory to: (1) give the propper outputs when scanning these points and (2) scan the points when the corresponding input is applied.

As a modification, two or more functions of $x$ [e.g. $f_1(x)$ and $f_2(x)$] might be generated simultaneously either by using two or more integrator circuits arranged so that one integrated the time between the first and second video signals, another that integrated the time between the first and third or third and fourth signals, etc. or by arranging the components to scan one function on the trace and the other on the retrace of the scanning circuit 13.

In a further modification it is possible to generate common functions (e.g. sin $x$ and cos $x$) simultaneously by using any well known switching circuit such as the commercially known "Electronic Switch" instrument in connection with the defection control circuit 14.

A still further modification is to replace the simple integrator circuit 16 with a somewhat more complex one in which the integration rate is controlled to be directly proportional to a second independent variable $y$ where $y$ can be either positive or negative, and the output of the generator becomes $y[f(x)]$.

Many other modifications would become apparent to one skilled in the art once the teachings of the present invention are before him. For example the generator can serve as an electronic multiplier where the control graph used is a straight line through the origin, $f(x)=Kx$, K is a constant and the output is KyX. Also by a well known analog computer arrangement the multiplier can then be made into a dividing circuit by the addition of a high gain amplifier appropriately connected.

From the foregoing it will be seen that an improved method of function generation has been provided wherein a television pick-up tube and television type scanning are used to read a function off of graph paper and a means controlling the video signal thus obtained to derive a voltage output which is governed by the function plotted on the graph paper.

Obviously many modifications and variations of the present invention are possible in the light of the above teachings. It is therefore to be understood that within the scope of the appended claims the invention may be practiced otherwise than as specifically described.

What is claimed:

1. A function generator for generating an output voltage that is directly proportional to a plotted function of an independent input variable comprising a television pick-up tube, means for focussing the image of a plotted function on the face of said tube, scanning generator circuit means coupled to said pick-up tube for deflecting the beam of said tube to scan said face in the ordinate direction of said plotted function, a second means for deflecting said beam parallel to the abscissa of said plotted function whereby video signals are generated as said beam crosses said abscissa and said function curve, and circuit means for integrating the time between said signals whereby a voltage output is directly proportional to the instantaneous value of the plotted function.

2. The function generator of claim 1 in which said circuit means comprises a video amplifier associated with said electron tube for receiving and transmitting said signals and an integrator means associated with said amplifier and generating a voltage output proportional to said function.

References Cited in the file of this patent

UNITED STATES PATENTS

| | | |
|---|---|---|
| 2,164,176 | Goldsmith | June 27, 1939 |
| 2,297,456 | Bruckersteinkuhl | Sept. 29, 1942 |
| 2,705,901 | Sherwin | Apr. 12, 1955 |
| 2,803,406 | Nuttal | Aug. 20, 1957 |
| 2,881,416 | Hosken | Apr. 7, 1959 |
| 2,887,587 | Polimerou | May 19, 1959 |

OTHER REFERENCES

I.R.E. Transactions (Polimerou), September 1954, pp. 29–33 (Electronic Computers).